(12) United States Patent
Potanin

(10) Patent No.: US 7,722,993 B2
(45) Date of Patent: May 25, 2010

(54) SOLID-STATE SECONDARY POWER SUPPLY

(75) Inventor: Aleksander Arkadievich Potanin, Sarov (RU)

(73) Assignee: The Potanin Institute Limited, Dublin (IE)

( * ) Notice: Subject to any disclaimer, the term of this patent is extended or adjusted under 35 U.S.C. 154(b) by 270 days.

(21) Appl. No.: 11/875,948

(22) Filed: Oct. 21, 2007

(65) Prior Publication Data

US 2008/0102373 A1 May 1, 2008

Related U.S. Application Data

(63) Continuation of application No. PCT/RU2006/000196, filed on Apr. 19, 2006.

(30) Foreign Application Priority Data

Apr. 21, 2005 (RU) .............................. 2005111722

(51) Int. Cl.
*H01M 6/18* (2006.01)
*H01M 4/58* (2006.01)

(52) U.S. Cl. ............... 429/316; 429/218.1; 429/231.95; 429/231.6

(58) Field of Classification Search ............... 429/218.1, 429/199, 316, 231.95, 231.6
See application file for complete search history.

(56) References Cited

U.S. PATENT DOCUMENTS

| 4,216,279 A | 8/1980 | Mellors | |
|---|---|---|---|
| 4,352,869 A | 10/1982 | Mellors | |
| 6,379,841 B1 * | 4/2002 | Potanin et al. | ........... 429/218.1 |
| 6,506,523 B1 * | 1/2003 | Hatazawa et al. | ........... 429/316 |

FOREIGN PATENT DOCUMENTS

| EP | 0055135 A2 | 6/1982 |
|---|---|---|
| GB | 1524126 | 9/1978 |
| RU | 2187178 C2 | 8/2002 |

OTHER PUBLICATIONS

International Search Report, mailed Aug. 24, 2006, from International Application No. PCT/RU2006/000196, filed Apr. 19, 2006.
English translation of International Preliminary Report on Patentability, dated Jan. 29, 2008, from International Application No. PCT/RU2006/000196, filed Apr. 19, 2006.
International Preliminary Report on Patentability from International application No. PCT/RU2006/000196, filed on Apr. 19, 2006, mailed Nov. 1, 2007.

* cited by examiner

*Primary Examiner*—Patrick Ryan
*Assistant Examiner*—Julian Mercado
(74) *Attorney, Agent, or Firm*—Houston Eliseeva LLP

(57) ABSTRACT

Application: in electric equipment as a secondary current source (storage battery). Nature of the invention: Solid-state secondary current source, consisting from an anode ($An^0$), in a form of a metal or an alloy of metals, whose fluorination leads to generation of fluoride or fluorides with high isobar generation potential, an electrolyte in a form of solid-state fluorine-ionic conductor with high ionic conductivity and low electronic conductivity and a cathode ($KtF^0$) in a form of fluoride or solid solution of fluorides with low isobar generation potential, with cathodic reaction during discharge $KtF^0 + e^- \rightarrow F^- + Kt'$ and anodic during discharge $An^0 + F^- \rightarrow An'F + e^-$, in which anode and cathode are reversible with respect to fluorine-ions with cathode reaction during charge-discharge: $KtF_x^0 + Xe^- \leftrightarrow XF^- + Kt'$ and anodic during charge-discharge $An^0 + XF^- \leftrightarrow An'F_x + Xe^-$ at voltages that are below voltages of solid electrolyte decomposition, and anode, electrolyte and cathode contain in their composition at least one component that prevents destruction of solid-state battery during charge-discharge cycles. Technical result: the composition of secondary solid-state current source allows achieving high specific energy characteristics of secondary batteries with high number of charge/discharge cycles, ensuring safety of their utilization and lengthy retention of electric energy.

20 Claims, No Drawings

SOLID-STATE SECONDARY POWER SUPPLY

RELATED APPLICATIONS

This application is a Continuation of PCT application serial number PCT/RU2006/000196 filed on Apr. 19, 2006, which in turn claims priority to Russian application serial number 2005111722 filed on Apr. 21, 2005 both of which are incorporated herein by reference in their entirety.

BACKGROUND OF THE INVENTION

Technology Area

The supposed invention relates to the electrotechnology area, in particular to secondary current sources (storage batteries) for use in electronic and microelectronic devices of telecommunication systems, portable computers, electric vehicles, etc., that demand safe rechargeable batteries with high energy capacity and low self-discharge. The following parameters can be considered as perspective ones for the wide areas of secondary battery application:

Specific energy capacity is of 500 W·h/kg
Energy density is of 600 Wh/dm$^3$
Number of charge/discharge cycles is about 1000
Self-discharge is about 1-3 percents per year.

But the highest specific energy parameters pose the safety problem that is a crucial one for such electrochemical cells. The energy density of the advanced batteries is about 500-1000 Wh/dm$^3$ or 1.8-3.6 kJ/cm$^3$. These values are comparable with the energies of explosive conversion of some ex-plosives, e.g. TNT 6.7 kJ/cm$^3$ (A. A. Potanin. Solid State Chemical Battery with LaF$_3$—Like Ionic Conductors.//Russ. Chem. Journ. (J. of Mend. Russ. Chem. Soc.), 2001, v. 45, No 5-6, pp. 58-63). Therefore, the solid-state current sources with a solid-state anode, an electrolyte and a cathode along with a solid-phase current producing reaction between the mentioned cathode and anode during charge/discharge processes are the most perspective among the well-known electrochemical batteries with the high specific energy parameters. The solid-state fluoride-ion current sources based on the solid-state fluoride-ion conductors are notable among those electrochemical batteries due to their high-energy capacity and safety (A. A. Potanin. Solid State Chemical Battery with LaF$_3$—Like Ionic Conductors.//Russ. Chem. Journ. (J. of Mend. Russ. Chem. Soc.), 2001, v. 45, No 5-6, pp. 58-63).

Preceding Level of Technology.

Solid-state current sources that are based on solid conductors of fluorine-ions, for which processes of charge and discharge are possible, are known. In particular, current sources which present the following composition in the discharged state are known at present, namely:

C/PbF$_2$ with KF additive/Ag
Pb/PbF$_2$ with KF additive/Ag
Pb/PbF$_2$ with KF additive/Cu
C/PbF$_2$ with KF additive/Cu
C/PbF$_2$ with KF additive/C, as well as the following compositions in the charged state:

Pb/PbF$_2$ with KF additive/AgF/Ag
Pb/PbF$_2$ with KF additive/CuF$_2$/Cu
Pb/PbF$_2$ with KF additive/PbF$_2$/C.

The solid electrolyte of these batteries is the composite fluoride based on lead fluoride with the additive of potassium fluoride. The Pb/AgF electrode couple used in these batteries is characterized by reversibility of the electrodes' processes. Thereby, the aforementioned batteries can be used both as the primary and the secondary cells. However, use of this secondary battery is characterized by a low energy capacity. The low values of energy capacity can be explained by the destruction of the electrolyte layer and short circuit due to the electrolysis of the solid electrolyte consisting of the lead fluoride and the following formation of Pb at the anode during the charge process. In consequence of this, during implementation of charge cycles realization of low charge capacity is possible and, as a result, the cur-rent source has low electrical capacity. An increase in electrical capacity of the given device can be achieved only through an increase in dimensions, which is not always allowable and justifiable, because in this case the cur-rent sources have very low specific characteristics.

For the above well-known current sources the specific energy capacity is of 0.45 W·h/kg and the energy density is of 3.6 W·h/dm$^3$, which is significantly lower than for nickel-cadmium accumulators (70 W·h/kg, 120 W·h/dm$^3$), or for lithium-ion accumulators (130 W·h/kg and 300 W·h/dm$^3$).

In another known current source (RF Patent No. 2187178 H01M 6/18, 10/36, issued on Oct. 8, 2002) it is possible to slightly increase specific energy characteristics and approach towards the same parameters as for the nickel-cadmium cells. This current source consists of the Pb-based anode, the silver fluoride-based cathode and a fluorine-ion conducting electrolyte. The electrolyte is the mixture of one fluoride of a rare-earth metal, e.g. LaF$_3$, with one fluoride of an alkaline-earth metal, namely BaF$_2$, and with at least one fluoride of an alkaline metal, such as KF or LiF. The patented galvanic cell has specific parameters such as 35 W·h/kg and 250 W·h/dm$^3$. These are reasonably low characteristics for prospective applications.

The drawback of the aforesaid well-known batteries is their low energy parameters, which are associated with a low energy capacity of the interaction between the fluoride and lead in anode. Theoretically, the energy capacity of such interaction in the anode is 219 A·h/kg (of the anode weight) and 26.2 A·h/dm$^3$ (of the anode weight). Besides, these batteries have low open circuit voltage (OCV)-about 1.2-1.3 V.

Moreover, the aforementioned secondary solid-state batteries have some problems arising in the anode and cathode structures as well as at the anode/electrolyte and cathode/electrolyte interfaces during charge/discharge processes that have not been solved. These problems are associated with the fact that during anodic reaction during charge PbF$_2$+ 2e—↔2F—+Pb the volume of solid phase decreases by 37% (during charge it increases correspondingly), due to differences in densities of PbF$_2$ and Pb, and for example in cathodic reaction during charge Ag+2F—↔AgF$_2$+2e—the volume of solid phase increases by 110% (during discharge it decreases correspondingly). The described changes are crucial for the solid phase processes and can result in the destruction of a current source even after a few charge/discharge cycles. So, the statement that the above batteries belong to a class of secondary cells is very relative.

Thus, the aforementioned well-known solid-state batteries where both the charge and the discharge processes can be realized have the following disadvantages:

Low specific energy parameters. These batteries could not be used in electronic and microelectronic devices of telecommunication systems, portable computers, electric vehicles, etc., that demand safe secondary sells with high-energy capacity.

Impossibility of multiple charge/discharge cycles. These batteries have the mechanical strength problems caused by change in density of both the cathode material and the anode material under charge/discharge cycles.

High-energy solid-state fluorine-ions current sources are known (A. A. Potanin. Solid State Chemical Battery with LaF₃—Like Ionic Conductors.//Russ. Chem. Journ. (J. of Mend. Russ. Chem. Soc.), 2001, v. 45, No 5-6, pp. 58-63).

At that, the battery structure is the following (anode/electrolyte/cathode):

La/LaF$_3$—BaF$_2$/BiF$_3$—KF,
La/LaF$_3$—BaF$_2$/PbF$_2$—KF,
Ce/CeF$_3$—SrF$_2$/BiF$_3$—KF,
Ce/CeF$_3$—SrF$_2$/PbF$_2$—KF.

During the discharge the following electrode reactions occur in the electrochemical current source like La/LaF$_3$—BaF$_2$/BiF$_3$—KF, namely:

At the anode: La+3F$^-$→LaF$_3$+3e$^-$

At the cathode: BiF$_3$+3e$^-$→Bi+3F$^-$

If the cathode material is the PbF$_2$—KF solid state solution, the following basic cathode reaction will take place:

$$\frac{3}{2}PbF_2 + 3e^- \rightarrow \frac{3}{2}Pb + 3F^-.$$

The realization of such chemical processes is confirmed by the fact that the thermodynamically computed Electric Driving Force (EDF) corresponds to the experimental value of source's open circuit voltage (OCV).

Introduction of some metal oxides, such as CuO, V$_2$O$_5$, MnO$_2$, Ag$_2$O, PbO$_2$ into the cathodes based on the BiF3 and PbF2 solid-state solutions leads to the rise of the specific energy capacities in the similar batteries (RF Patent No. 2136083, HO1M6/18, in Information Bulletin No 24, 1999, U.S. Pat. No. 6,379,841 B1, HO1M4/58, Apr. 4, 2002).

In that case during discharge of the battery an additional exoteric redox reaction occurs in the cathode layer along with the formation of the solid phase products e.g.:

Anode: 2La+6F$^-$−6e$^-$→2LaF$_3$

Cathode:

$$2BiF_3 + \frac{3}{y}Me_xO_y + 6e^- \rightarrow Bi_2O_3 + \frac{3x}{y}Me + 6F^-$$

The overall reaction defining the source's EDF is the following:

$$2La + 2BiF_3 + \frac{3}{y}Me_xO_y \rightarrow 2LaF_3 + Bi_2O_3 + \frac{3x}{y}Me.$$

The specific energy characteristics for the known batteries in the form of a single galvanic cell are presented below in the table 1.

TABLE 1

Energy parameters for the La/LaF$_3$—BaF$_2$/BiF$_3$—KF battery containing CuO in the cathode
(Discharge temperature: 550° C.; current density: 100 mA/cm$^2$; operating voltage: up to 2 V)

| Contents of CuO in the cathode, mass % | Specific capacity | | Specific energy capacity | |
|---|---|---|---|---|
| | A·h/kg | A·h/dm³ | W·h/kg | A·h/dm³ |
| 0 | 57 | 323 | 125 | 710 |
| 1 | 85 | 464 | 197 | 1120 |
| 10 | 65 | 366 | 155 | 878 |
| 20 | 38 | 210 | 91 | 569 |
| 30 | 33 | 185 | 80 | 449 |

These results were obtained experimentally, which satisfies the criterion of practical implementation of solid-state fluorine-ions current sources with very high specific energy capacity. The achieved level of specific energy characteristics satisfies the necessary level of the presented secondary solid-state current source; therefore this composition of the current sources is the closest to the presented.

The aforementioned batteries possessing the high specific energy parameters have some disadvantages namely:

The described batteries relate to the primary batteries only. Their structure provides conditions only for the discharge process, while under the influence of the EDF a fluoride ion from the cathode diffuses through the solid electrolyte to the anode, where the anode reaction occurs. The charge/discharge processes that are typical for a secondary battery can not be realized in such current source because of the following, namely:

1. If the charge of the battery is done after the discharge, the electrolysis of the anodic material along with the formation of the thread-like electron-conducting structures (dendrites), directed to electrolyte layer might take place. After that electrolysis of electrolyte layer occurs, upon reaching dendrites of the cathode layer the current source stops working.

2. Very low charge capacity is realized during electrolysis of anode layer (single percentages of the potential) and high specific energy characteristics that are obtainable during discharge of primary current source become unavailable in the case of the secondary current source.

3. The device does not address the issues of preservation of mechanical strength of solid-state current sources, specifically the strength of anode, cathode and also the separation boarders of anode/electrolyte and cathode/electrolyte during the course of charge and discharge processes in solid-state current sources.

SUMMARY OF THE INVENTION

The task, which is addresses in the present invention, is the creation of a safe secondary solid-state battery, possessing the high specific energy parameters along with a large quantity of the charge/discharge cycles.

The technical result, which may be reached from the use of the present invention, is the following:

The high specific energy parameters (up to 500 W·h/kg and up to 600 W·h/dm³) along with excellent safety:

The number of charge/discharge cycles is up to 1000 and more;

High level of the stored energy along with the battery low self-discharge (1-3 percentages per year).

In order to accomplish the aforementioned task and technical result, namely to create a structure of the solid-state battery having the high specific energy parameters, the following structure is proposed:

1. A solid-state battery consisting of a solid anode (An⁰) based on a metal or alloy, whose fluorination leads to a fluoride or fluorides with a high isobar formation potential; a solid electrolyte in the form of a solid fluoride-ion conductor with low electron conductivity and a solid cathode ($KtF^0$) based on a fluoride or a solid solution of the fluorides with a low isobar formation potential. During the discharge in the present invention the following anode and cathode reactions take place: $An^0+F^-\rightarrow An'F+e^-$ and $KtF^0+e^-\rightarrow F^-+Kt'$, correspondingly. According to the invention both the anode and the cathode are reversible to fluorine-ion at the voltages that are less than the decomposition voltages of the solid electrolyte during the charge/discharge process at the cathode reaction as $Kt^0F_x+Xe^-\leftrightarrow XF^-+Kt'$ and the anode reaction like $An^0+XF^-\leftrightarrow An'F_x+Xe^-$; and the anode, the electrolyte and the cathode include at least one component preventing the battery destruction during the charge/discharge cycles.

2. In order to obtain high specific energy characteristics and at the same time safety in the presented solid-state current source that is based on solid fluorine-ion conductors, high-energy current-generating solid phase anodic and cathodic reactions are realized.

For that:

In the charged state the battery anode is a metal (or its alloy) selected from the group consisting of Li, K, Na, Sr, Ba, Ca, Mg, Al, Ce, La or their alloys, or from the alloys of the listed metals with the metals, selected from the group of Pb, Cu, Bi, Cd, Zn, Co, Ni, Cr, Sn, Sb, Fe; and in the discharged state the anode consists of the fluorides of the aforementioned metals, correspondingly.

The solid-state battery electrolyte can be made from:

the fluorides of La, Ce or the compound fluorides based on them together with an alloying additives, such as fluoride/fluorides of alkaline-earth metals ($CaF_2$, $SrF_2$, $BaF_2$) and/or fluorides of alkaline metals (LiF, KF, NaF) and/or alkaline metal chlorides (LiCl, KCl, NaCl);

or the compound fluorides based on the alkaline-earth metal fluorides ($CaF_2$, $SrF_2$, $BaF_2$) with an alloying additives of the rare-earth metal fluorides or/and the alkaline metal fluorides (LiF, KF, NaF);

or the compound fluorides based on $PbF_2$ containing $SrF_2$, or $BaF_2$, or $CaF_2$, or $SnF_2$ along with KF additive;

or the compound fluorides based on $BiF_3$ containing $SrF_2$, or $BaF_2$, or $CaF_2$, or $SnF_2$ along with KF additive.

In the charged state the battery cathode can be made from the simple fluorides, such as $MnF_2$, $MnF_3$, $TaF_5$, $NdF_5$, $VF_3$, $VF_5$, CuF, $CuF_2$, AgF, $AgF_2$, $BiF_3$, $PbF_2$, $PbF_4$, $CdF_2$, $ZnF_2$, $CoF_2$, $CoF_3$, $NiF_2$, $CrF_2$, $CrF3$, $CrF_5$, $GaF_3$, $InF_2$, $InF_3$, $GeF_2$, $SnF_2$, $SnF_4$, $SbF_3$, $MoF_5$, $WF_5$, fluorinated black lead or the alloys based on them, or their mixtures; and in the discharged state it can be made from the metal selected from the group of Mn, Ta, Nd, VF, Cu, Ag, Bi, Pb, Cd, Zn, Co, Ni, Cr, Ga, In, Ge, Sn, Sb, Mo, W, black lead, or the listed metal alloys, or the mixture.

3. The composition of solid anode is reversible with respect to fluorine ions and allows realization of anodic reversible solid-phase reaction (in general view: $An^0+XF^-\leftrightarrow An'F_x+Xe^-$), for those purposes, the recreated form of anodic material $An^0$ has high electronic conductivity, whose fluorination leads to formation of fluoride $An'F_x$ with high conductivity of fluorine ions in solid phase; or for ensuring diffusion of fluorine ions to anodic material ($An^0+XF^-$) and exit of electrons to external circuit of the current source ($An'F_x+Xe$) additionally anodic material contains additives, which ensure the ionic conductivity and electronic conductivity that are required for reversible reaction.

4. Composition of solid cathode is reversible with respect to fluorine-ions and allows realization of a reversible solid-phase cathodic reaction (in general appearance: $KtF_x^0+Xe^-\leftrightarrow XF^-+Kt'$), for those purposes recreated form of cathodic material Kt' has high electronic conductivity, the fluoride-containing phase $KtF_x^0$ possesses high fluoride-ions conductivity or for ensuring diffusion of fluorine-ions in the cathodic material ($XF^-+Kt'$) and supply of electrons from external circuit of the current source $KtF_x^0+Xe^-$) cathodic material additionally contains additives, which ensure the ionic conductivity and electronic conductivity that are required for reversible reaction.

5. The composition of solid electrolyte allows realization of high conductivity of fluorine-ions in solid phase, while having very low or practically absent electronic conductivity. Solid electrolyte decomposition voltage during charge process must be higher then voltage of solid-phase electrolysis of oxidized form of anodic material. This is achieved by optimization of chemical composition of solid electrolyte or/and addition of additives, from materials with low or practically absent electric conductivity and that increase electrolyte decomposition voltage, to electrolyte.

6. The composition of the solid-state secondary current source includes additional component or components, which are included in the composition of the anode, the electrolyte and the cathode and prevent destruction of the solid-state battery due to mechanical stress during charge-discharge cycles.

DETAILED DESCRIPTION OF THE PREFERRED EMBODIMENTS

A Version of Invention Implementation

Table 2 contains the energy characteristics for some solid-state fluoride ion batteries with different compositions of cathode and anode.

The calculations were made for the simplified solid-state current-producing reaction like $zMe+Me_x'F_y\rightarrow Me_zF_y+xMe'$, taking place in the battery consisting of:

An anode: a metal-Me;

An electrolyte: A solid-state fluorine-ion conductor with low electron conductivity;

A cathode: Metal fluoride $Me_x'F_y$, and with the reactions at the electrodes, such as:

At the anode: $z \cdot Me + y \cdot F^- \rightarrow Me_zF_y + y \cdot \overline{e}$ At the cathode: $Me_x'F_y + y \cdot \overline{e} \rightarrow x \cdot Me' + yF^{31}$.

E—voltage of electrochemical system or the Electric Driving Force (EDF). The EDF was calculated from the equation (1), $$E=-\Delta G^0_r(T)/n \cdot F, \qquad (1)$$

where n—the total number of electrons participating in the potential forming reaction; F—Faraday constant; $\Delta G^0_r(T)$—the change of the Gibbs energy of the reaction, calculated from the Gibbs-Helmholtz equation (2).

$$\Delta G^0_r(T)=\Delta H^0_r(T)-T \cdot \Delta S^0_r(T), \qquad (2)$$

where $\Delta H^0_r(T)$ and $\Delta S^0_r(T)$ are the changes of the enthalpy and the entropy of the reaction at temperature T, correspondingly.

W—the specific energy capacity, that is the electric energy of the discharge per a unit of battery mass (W·h/kg) (3):

$$W=Cm \cdot E, \qquad (3)$$

where E is the EDF, Cm is the specific capacity (A·h/kg), calculated from $v \cdot y \cdot F$, wherein v—a number of active moles of the substance; y is a number of electrons taking part in the anodic reaction, F—is Faraday constant.

Wv—the energy density, that is the electric energy of the discharge per a unit of battery volume (W·h/dm³) (4):

$$Wv=W/V, \qquad (4)$$

where V—the overall volume of the battery (dm³).

For comparison purposes table 2 contains parameters of a known previously reviewed current source with a lead anode and a cathode made from AgF.

TABLE 2

| Reaction | OCV | Specific Capacity A·h/kg | Electrical Density A·h/dm³ | Specific Energy W·h/kg | Energy Density W·h/dm³ |
|---|---|---|---|---|---|
| $2AgF + Pb \rightarrow PbF_2 + 2Ag$<br>An: $PbF_2 - 2F^- \rightarrow Pb^0$<br>Kt: $2Ag + 2F^- \rightarrow 2AgF$ | 1.26 | 116.3 | 868 | 146.54 | 1094 |
| $3AgF + La \rightarrow LaF_3 + 3Ag$<br>An: $LaF_3 - 3F^- \rightarrow La^0$<br>Kt: $3Ag + 3F^- \rightarrow 3AgF$ | 3.9 | 154.73 | 921 | 603 | 3589 |
| $3AgF + Al \rightarrow AlF_3 + 3Ag$<br>An: $AlF_3 - 3F^- \rightarrow Al^0$<br>Kt: $3Ag + 3F^- \rightarrow 3AgF$ | 2.5 | 197 | 1071 | 492.5 | 2677 |
| $3SnF_2 + 2Al \rightarrow 2AlF_3 + 3Sn$<br>An: $2AlF_3 - 6F^- \rightarrow 2Al^0$<br>Kt: $3Sn^0 + 6F^- \rightarrow 3SnF_2$ | 1.24 | 307 | 1364.4 | 380.68 | 1691.9 |
| $3MnF_2 + 2La \rightarrow 2LaF_3 + 3Mn$<br>An: $2LaF_3 - 6F^- \rightarrow 2La^0$<br>Kt: $3Mn + 6F^- \rightarrow 3MnF_2$ | 1.92 | 289 | 1383 | 554.9 | 2655 |
| $MnF_3 + La \rightarrow LaF_3 + Mn$<br>An: $LaF_3 - 3F^- \rightarrow La^0$<br>Kt: $Mn + 3F^- \rightarrow MnF_3$ | 2.6 | 320.51 | 1483.8 | 833.33 | 3858 |
| $CoF_3 + La \rightarrow LaF_3 + Co$<br>An: $LaF_3 - 3F^- \rightarrow La^0$<br>Kt: $Co^0 + 3F^- \rightarrow CoF_3$ | 3.31 | 315.49 | 1531.5 | 1044.27 | 5069.3 |
| $CuF_2 + 2Li \rightarrow 2LiF + Cu$<br>An: $2LiF - 2F^- \rightarrow 2Li^0$<br>Kt: $Cu^0 + 2F^- \rightarrow CuF_2$ | 3.46 | 464.4 | 1072.5 | 1606.82 | 3710.9 |
| $NiF_2 + 2Li \rightarrow 2LiF + Ni$<br>An: $2LiF - 2F^- \rightarrow 2Li^0$<br>Kt: $Ni^0 + 2F^- \rightarrow NiF_2$ | 2.83 | 484.72 | 1143.2 | 1371.6 | 3235.3 |
| $PbF_2 + 2Li \rightarrow 2LiF + Pb$<br>An: $2LiF - 2F^- \rightarrow 2Li^0$<br>Kt: $Pb^0 + 2F^- \rightarrow PbF_2$ | 2.84 | 206.91 | 971.4 | 587.62 | 2758.8 |
| $CdF_2 + Ca \rightarrow CaF_2 + Cd$<br>An: $CaF_2 - 2F^- \rightarrow Ca^0$<br>Kt: $Cd^0 + 2F^- \rightarrow CdF_2$ | 2.7 | 281.37 | 1099.1 | 759.7 | 2967.6 |
| $2SbF_3 + 3Ba \rightarrow 3BaF_2 + 2Sb$<br>An: $3BaF_2 - 6F^- = 3Ba^0$<br>Kt: $2Sb + 6F^- \rightarrow 2SbF_3$ | 3.05 | 209 | 839.4 | 637.45 | 2560 |
| $2BiF_3 + 3Sr \rightarrow 3SrF_2 + 2Bi$<br>An: $3SrF_2 - 6F^- = 3Sr^0$<br>Kt: $2Bi + 6F^- \rightarrow 2BiF_3$ | 3.11 | 202.31 | 802.8 | 629.18 | 2496.7 |

From to the results presented in the table 2 it is evident that the highest specific energy characteristics can be achieved in the secondary solid-state battery with the presented compositions of the cathode and the anode.

Table 3 contains parameters of electric capacity of electrode reactions of some solid-state current sources and corresponding changes in mass and volume of electrodes during charge-discharge cycles of some solid-state current sources from the list presented in the above mentioned section 2.

TABLE 3

| Reaction | Specific Capacity of Electrodes A·h/kg | Specific Density of Electrodes A·h/dm³ | Change of electrodes' mass during charge (%) | Change of electrodes' volume during charge (%) |
|---|---|---|---|---|
| $2AgF + Pb \rightarrow PbF_2 + 2Ag$ | | | | |
| An: $PbF_2 - 2F^- \rightarrow Pb^0$ | 219 | 26.2 | −15.6 | −37.5 |
| Kt: $2Ag + 2F^- \rightarrow 2AgF$ | 248 | 23.6 | 17.6 | 111 |
| $3AgF + La \rightarrow LaF_3 + 3Ag$ | | | | |
| An: $LaF_3 - 3F^- \rightarrow La^0$ | 410 | 69 | −29 | −31.5 |

TABLE 3-continued

| Reaction | Electrode parameters | | | |
| --- | --- | --- | --- | --- |
| | Specific Capacity of Electrodes $A \cdot h/kg$ | Specific Density of Electrodes $A \cdot h/dm^3$ | Change of electrodes' mass during charge (%) | Change of electrodes' volume during charge (%) |
| Kt: $3Ag + 3F^- \rightarrow 3AgF$ | 248 | 23.6 | 17.6 | 111 |
| $3AgF + Al \rightarrow AlF_3 + 3Ag$ | | | | |
| An: $AlF_3 - 3F^- \rightarrow Al^0$ | 962 | 313.4 | −67.9 | −63.5 |
| Kt: $3Ag + 3F^- \rightarrow 3AgF$ | 248 | 23.6 | 17.6 | 111 |
| $3SnF_2 + 2Al \rightarrow 2AlF_3 + 3Sn$ | | | | |
| An: $2AlF_3 - 6F^- \rightarrow 2Al^0$ | 962 | 313.4 | −67.9 | −63.5 |
| Kt: $3Sn^0 + 6F^- \rightarrow 3SnF_2$ | 452 | 77.3 | 32 | 61 |
| $3MnF_2 + 2La \rightarrow 2LaF_3 + 3Mn$ | | | | |
| An: $2LaF_3 - 6F^- \rightarrow 2La^0$ | 410 | 69 | −29 | −32 |
| Kt: $3Mn + 6F^- \rightarrow 3MnF_2$ | 971 | 130.5 | 69.2 | 221 |
| $MnF_3 + La \rightarrow LaF_3 + Mn$ | | | | |
| An: $LaF_3 - 3F^- \rightarrow La^0$ | 410 | 69 | −29.1 | −31.6 |
| Kt: $Mn + 3F^- \rightarrow MnF_3$ | 488 | 65.6 | 103.7 | 328 |
| $CoF_3 + La \rightarrow LaF_3 + Co$ | | | | |
| An: $LaF_3 - 3F^- \rightarrow La^0$ | 410 | 69 | −29.1 | −31.6 |
| Kt: $Co^0 + 3F^- \rightarrow CoF_3$ | 1370 | 155 | 96.7 | 348 |
| $CuF_2 + 2Li \rightarrow 2LiF + Cu$ | | | | |
| An: $2LiF - 2F^- \rightarrow 2Li^0$ | 1031 | 392 | −73.2 | 31.8 |
| Kt: $Cu^0 + 2F^- \rightarrow CuF_2$ | 840 | 93.8 | 59.8 | 238 |
| $NiF_2 + 2Li \rightarrow 2LiF + Ni$ | | | | |
| An: $2LiF - 2F^- \rightarrow 2Li^0$ | 1031 | 392 | −73.2 | 31.8 |
| Kt: $Ni^0 + 2F^- \rightarrow NiF_2$ | 909 | 102 | 64.7 | 217 |
| $PbF_2 + 2Li \rightarrow 2LiF + Pb$ | | | | |
| An: $2LiF - 2F^- \rightarrow 2Li^0$ | 1031 | 392 | −73.2 | 31.8 |
| Kt: $Pb^0 + 2F^- \rightarrow PbF_2$ | 258 | 22.8 | 18.3 | 60 |
| $CdF_2 + Ca \rightarrow CaF_2 + Cd$ | | | | |
| An: $CaF_2 - 2F^- \rightarrow Ca^0$ | 685 | 215.4 | −48.7 | 6 |
| Kt: $Cd^0 + 2F^- \rightarrow CdF_2$ | 476 | 55.0 | 33.8 | 74 |
| $2SbF_3 + 3Ba \rightarrow 3BaF_2 + 2Sb$ | | | | |
| An: $3BaF_2 - 6F^- = 3Ba^0$ | 306 | 63.4 | −21.7 | 0.6 |
| Kt: $2Sb + 6F^- \rightarrow 2SbF_3$ | 662 | 96.5 | 46.8 | 130 |
| $2BiF_3 + 3Sr \rightarrow 3SrF_2 + 2Bi$ | | | | |
| An: $3SrF_2 - 6F^- = 3Sr^0$ | 427 | 100.7 | −30.2 | 12.4 |
| Kt: $2Bi + 6F^- \rightarrow 2BiF_3$ | 385 | 39.3 | 27.3 | 134 |

According to the presented results in the secondary solid-state batteries changes in volumes of both the cathode and the anode occur during the charge/discharge processes. As a result, the mechanical stress arises in the areas adjacent to the anode and cathode as well as at both the anode/electrolyte and the cathode/electrolyte interfaces. Introduction of an additional component (components) will allow strengthening the battery construction. This component (components) can be done from the polymers, e.g. fluorocarbon polymers, or ionic conductors, or/(and) glasses.

The working principle of the presented secondary solid-state current source consists of the following:

During a discharge of the current source solid phase high-energy current-producing reaction with participation of fluorine-ions is realized: during short circuit of an external circuit on the border of current collector and cathode, arriving electrons, under an influence from internal EDF, initiate diffusion of fluorine-ions in solid-phase of cathode with formation of the recreated cathode's form, after the diffusive transfer of fluorine ions in solid electrolyte and their transfer to the area of anode, solid-state interaction of fluorine ions with anodic material and formation of fluoride (oxidized form of anode) with following transfer of electrons to an external circuit takes place in the anode, ensuring high specific electric and energy characteristics (Table 2, 3).

During a charge of the current source under an influence of an external electrical field the following processes take place on the reversible electrodes—anode and cathode. Under the influence of the external electrical field solid-phase electrolysis of the oxidized form of the anode occurs with following diffusion of fluorine-ions through electrolyte and fluorination of the recreated phase of cathode with transfer of electrons to an external circuit.

Self-discharge. The current source has low self-discharge (1-3% per year) because of the very low electronic conductivity of the solid electrolyte.

Safety. The current source is safe, because stable solid materials are used in the composition, and during charge and discharge only solid-phase processes occur, there are no aggressive gas or liquid phases.

Presented composition of the secondary solid state current source allows to achieve the technical result, specifically high specific energy characteristics of secondary batteries with high number of charge/discharge cycles, while providing safety of their utilization and long-term storage of electrical energy.

While this invention has been particularly shown and described with references to preferred embodiments thereof, it will be understood by those skilled in the art that various changes in form and details may be made therein without departing from the scope of the invention encompassed by the appended claims.

What is claimed is:

1. A secondary solid state current source comprising
an anode ($An^0$) made of a metal or an alloy forming via fluorination a fluoride or fluorides,
an electrolyte made of a solid fluoride-ion conductor; and
a solid cathode ($KtF^0$) based on a fluoride or a solid solution of fluorides with an isobar formation potential lower than an isobar formation potential of the fluoride or fluorides formed on the anode by the fluorination;
wherein cathode discharge reaction is $KtF^0+e^- \rightarrow F^-+Kt'$;
wherein anode discharge reaction is $An^0+F^- \rightarrow An'F+e^-$;
wherein the cathode is reversible with respect to fluorine-ions in a charge-discharge cathode reaction $KtF_x^0 + Xe^{31} \leftrightarrow XF^-+Kt'$ under voltages less than decomposition voltage of the electrolyte;
wherein the anode is reversible with respect to fluorine ions in a charge-discharge anode reaction $An^0+XF^- \leftrightarrow An'F_x+Xe^-$ under voltages less than decomposition voltage of the electrolyte; and
wherein the anode, the electrolyte and the cathode comprise at least one component preventing destruction of the secondary solid state current source during the charge/discharge.

2. The secondary solid state current source according to claim 1, wherein the reversibility of both the anode and the cathode is achieved by introducing solid fluoride ion conductors into the anode and the cathode.

3. The secondary solid state current source according to claim 2,
wherein in a charged state the anode is Li, K, Na, Sr, Ba, Ca, Mg, Al, Ce, or La, or an alloy thereof, or an alloy of Li, K, Na, Sr, Ba, Ca, Mg, Al, Ce, and/or La with Pb, Cu, Bi, Cd, Zn, Co, Ni, Cr, Sn, Sb, and/or Fe; and
wherein in a discharged state the anode comprises a fluoride or fluorides of Li, K, Na, Sr, Ba, Ca, Mg, Al, Ce, and/or La.

4. The secondary solid state current source according to claim 2,
wherein in a charged state the cathode comprises $MnF_2$, $MnF_3$, $TaF_5$, $NdF_5$, $VF_3$, $VF_5$, CuF, $CuF_2$, AgF, $AgF_2$, $BiF_3$, $PbF_2$, $PbF_4$, $CdF_2$, $ZnF_2$, $CoF_2$, $CoF_3$, $NiF_2$, $CrF_2$, $CrF_3$, $CrF_5$, $GaF_3$, $InF_2$, $InF_3$, $GeF_2$, $SnF_2$, $SnF_4$, $SbF_3$, $MoF_5$, $WF_5$, fluorinated black lead, alloys thereof, or mixtures thereof; and
wherein in a discharged state the cathode comprises Mn, Ta, Nd, VF, Cu, Ag, Bi, Pb, Cd, Zn, Co, Ni, Cr, Ga, In, Ge, Sn, Sb, Mo, W, black lead, alloys thereof, or mixtures thereof.

5. The secondary solid state current source according to claim 1, wherein the reversibility of both the anode and the cathode is achieved by introducing solid conductors into the anode and the cathode.

6. The secondary solid state current source according to claim 1,
wherein in a charged state the anode is Li, K, Na, Sr, Ba, Ca, Mg, Al, Ce, or La, or an alloy thereof, or an alloy of Li, K, Na, Sr, Ba, Ca, Mg, Al, Ce, and/or La with Pb, Cu, Bi, Cd, Zn, Co, Ni, Cr, Sn, Sb, and/or Fe; and
wherein in a discharge state the anode comprises a fluoride or fluorides of Li, K, Na, Sr, Ba, Ca, Mg, Al, Ce, and/or La.

7. The secondary solid state current source according to claim 1,
wherein in a charged state the cathode comprises $MnF_2$, $MnF_3$, $TaF_5$, $NdF_5$, $VF_3$, $VF_5$, CuF, $CuF_2$, AgF, $AgF_2$, $BiF_3$, $PbF_2$, $PbF_4$, $CdF_2$, $ZnF_2$, $CoF_2$, $CoF_3$, $NiF_2$, $CrF_2$, $CrF_3$, $CrF_5$, $GaF_3$, $InF_2$, $InF_3$, $GeF_2$, $SnF_2$, $SnF_4$, $SbF_3$, $MoF_5$, $WF_5$, fluorinated black lead, alloys thereof, or mixtures thereof; and
wherein in a discharged state the cathode comprises Mn, Ta, Nd, VF, Cu, Ag, Bi, Pb, Cd, Zn, Co, Ni, Cr, Ga, In, Ge, Sn, Sb, Mo, W, black lead, alloys thereof, or mixtures thereof.

8. The secondary solid state current source according to claim 1,
wherein the solid electrolyte is a fluoride of La or Ce or a compound fluoride based on a fluoride of La and/or a fluoride Ce, further comprising a fluoride or fluorides of alkaline-earth metals, and/or a fluoride or fluorides of alkaline metals, and/or a chloride or chlorides of alkaline metals.

9. The secondary solid-state current source according to claim 8, wherein the solid electrolyte comprises a mixture of two or more of the solid electrolytes.

10. The secondary solid state current source according to claim 1,
wherein the solid electrolyte comprises compound fluorides based on the alkaline-earth metal fluorides and further comprises alloying additives of a rare-earth metal fluoride or/and a fluoride of an alkaline metal or/and a chloride of an alkaline-metal.

11. The secondary solid-state current source according to claim 10, wherein the solid electrolyte comprises a mixture of two or more of the solid electrolytes.

12. The secondary solid state current source according to claim 1 wherein the solid electrolyte comprises compound fluorides based on $PbF_2$, containing $SrF_2$, or $BaF_2$, or $CaF_2$, or $SnF_2$ with KF.

13. The secondary solid-state current source according to claim 12, wherein the solid electrolyte comprises a mixture of two or more of the solid electrolytes.

14. The secondary solid state current source according to claim 1, wherein the solid electrolyte comprises compound fluorides based on $BiF_3$, containing $SrF_2$, or $BaF_2$, or $CaF_2$, or $SnF_2$ with KF.

15. The secondary solid-state current source according to claim 14, wherein the solid electrolyte comprises a mixture of two or more of the solid electrolytes.

16. The secondary solid state current source according to claim 1, wherein polymers chemically stable with respect to the anode, the electrolyte, and the cathode during the charge/discharge are used to prevent the destruction of the source.

17. The secondary solid state current source according to claim 16, wherein the polymers are fluoride-containing polymers and their mixtures.

18. The secondary solid state current source according to claim 1 comprising solid fluoride ion conductors prevent destruction of the source during the charge/discharge.

19. The secondary solid-state current source according to claim 18, wherein the solid fluoride ion conductor is the electrolyte.

20. The secondary solid state current source according to claim 1 wherein materials based on glass or glassy materials prevent destruction of the source during the charge/discharge.

* * * * *